VAN EVERY EDWARDS.
HOME SAVINGS BANK.
APPLICATION FILED NOV. 8, 1921.

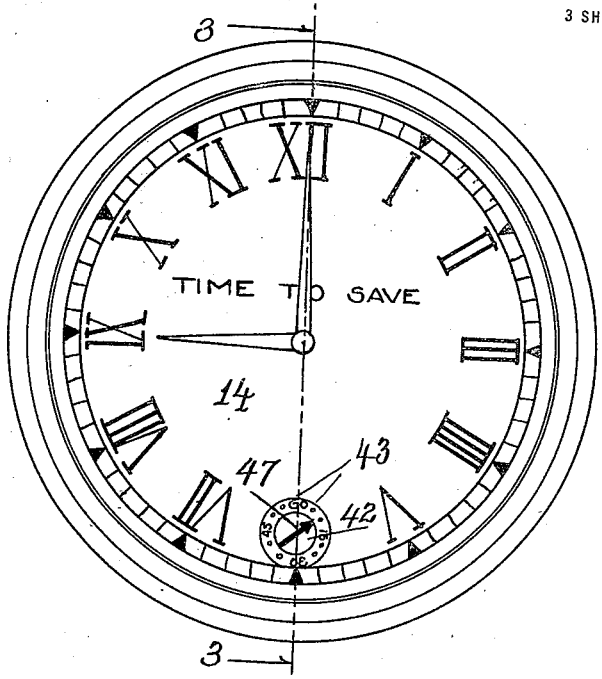
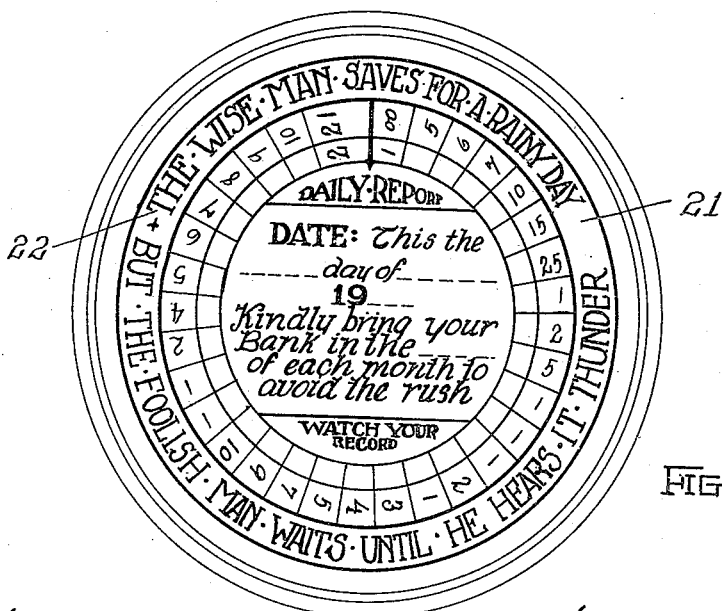

1,432,680.

Patented Oct. 17, 1922.
3 SHEETS—SHEET 3.

Witnesses.
Wayne Hudson
Charlotte A. DuBois.

Inventor.
Van Every Edwards.
by Atty. N. DuBois.

Patented Oct. 17, 1922.

1,432,680

UNITED STATES PATENT OFFICE.

VAN EVERY EDWARDS, OF SPRINGFIELD, ILLINOIS, ASSIGNOR OF ONE-FOURTH TO WILLIAM F. HUEGEL, ONE-FOURTH TO THOMAS LAWRENCE, AND ONE-FOURTH TO THOMAS T. THOMPSON, ALL OF SPRINGFIELD, ILLINOIS.

HOME SAVINGS BANK.

Application filed November 8, 1921. Serial No. 513,717.

*To all whom it may concern:*

Be it known that I, VAN EVERY EDWARDS, a citizen of the United States, residing at Springfield, in the county of Sangamon and State of Illinois, have invented a new and useful Home Savings Bank, of which the following is a specification.

The invention relates to home-savings banks for accumulating the savings of the user from day to day.

The purposes of the invention are to stimulate thrift of the user and to induce him to deposit his accumulated savings from time to time in the commercial or business bank supplying its customers with home-savings banks; to provide means for effectively advertising the commercial bank; to provide means for showing accurately the amount of cash in the home-savings bank at any time; to provide a cash box of improved construction; to provide a simple and effective permutation lock for locking the cash box; to provide means for preventing the extracting of money from the cash box; to provide attractive and easily renewable covering for the casing in order that the covering may easily and quickly be changed after the bank has been used by one customer to renovate the bank completely so that it will be in neat and attractive condition in readiness for the next user; and to provide other improved details of construction, as will hereinafter appear.

The invention is illustrated in the accompanying drawings, to which reference is hereby made and will now be described in detail and the novel features thereof will be recited in the claims.

Fig. 2 is a top plan of the cash box of the same bank;

Fig. 4 is an inside view of the detached and inverted cover of the same bank;

The same reference numerals designate the same parts in all the views.

Figure 1:
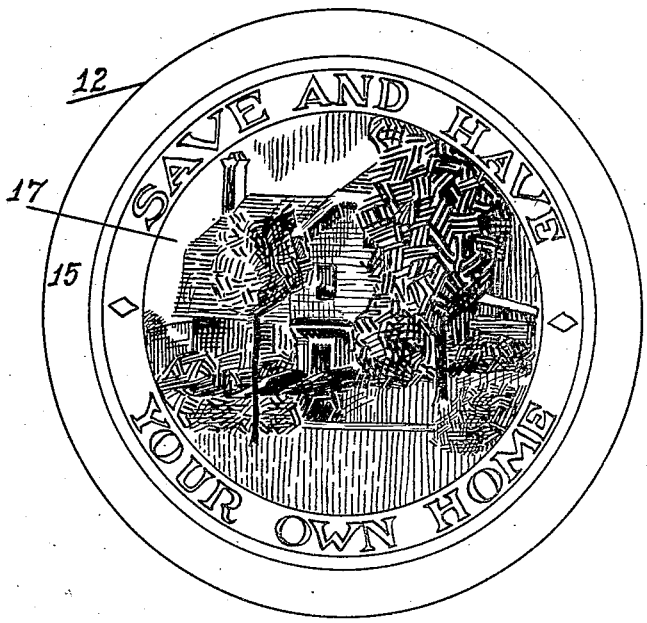
Figure 1 is a top plan of a home-savings bank embodying my invention.

The main structure comprises a casing or cover 12, a cash box 13, and a dial plate 14, all of which are usually and preferably pressed from thin sheet metal.

The casing 12 is a cylindrical box closed at one end and having at its closed end an annular flat surface 15 and a circular depression 16 containing a removable tablet 17 on which is printed or embossed, or applied in any other suitable manner, the picture of a cottage and the words "Save and have your own home." The face of the tablet being slightly below the annular flat surface is thereby protected from wear when the casing is removed and inverted. The casing has also an upper circumferential rim 18 and a lower circumferential rim 19. A number of rings of paper of desirable color or colors surround the casing between the rims 18 and 19 and the rims prevent accidental tearing or displacement of the rings. The paper rings may be all of one color or may be of varied colors. When the outer paper ring becomes soiled or worn in use it may be stripped off to uncover the underlying fresh ring, so that with a little care the casing will always have a tidy appearance. The paper rings will usually bear a displayed advertisement of the commercial bank which supplies the home-savings banks.

A paper disk 21 is fixed on the inner face of the casing and comprises spaces for recording deposits from day to day, and for the purpose of inculcating the wisdom of saving, bears the aphorism "The wise man saves for a rainy day, but the foolish man waits until he hears it thunder."

The cash box, designated as a whole by the numeral 13, comprises a bottom plate 23, a circumferential wall 24, an annular flat top-member 25 and an internal flat circular flange 26. The parts 24, 25 and 26 are unitary and are pressed from a suitable disk of thin sheet metal.

The bottom plate 23 comprises an outwardly extended circumferential flat flange 27, a circumferential groove 28 and a recess 29 bounded by the flange 27. The plate 23 and its flange 27 are pressed from a disk of thin sheet metal. The circumferential wall 24 has a bead 30 which snaps into the groove 28 to secure the wall 24 on the plate 23.

A slot 31 in the wall 24 admits coins into the cash box and an opening 32 in the wall 24 admits of inserting closely rolled currency, one bill at a time, through the opening into the cash box. Concavo-convex plates 33 having springy prongs 34 are fixed on the inner face of the wall 24 and the prongs yield to permit insertion of coins and act to prevent extracting the coins.

The dial plate 14 serves two purposes; 1st it serves as a closure for the cash box; and 2nd it serves as an operative element of the locking device.

Figure 5:
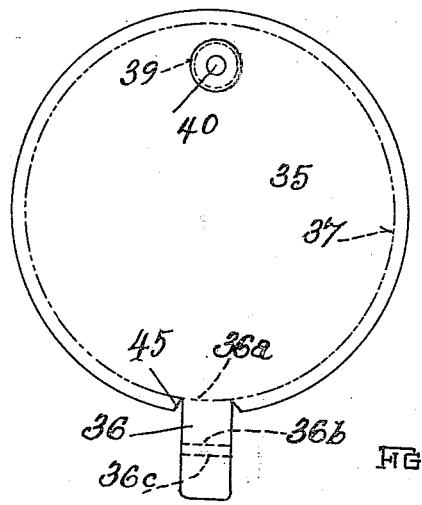
Fig. 5 is a bottom plan of the blank from which the dial plate is formed.
Figure 6:
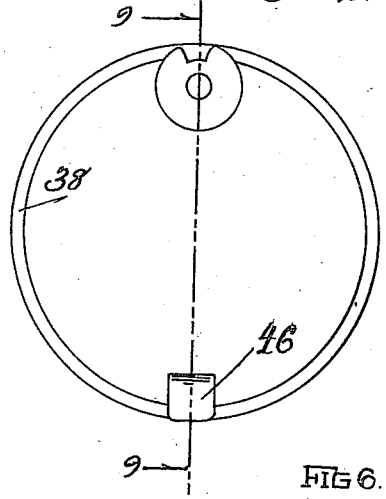
Fig. 6 is a bottom view of the dial plate and the rotative disk carried thereby.
Figure 8:
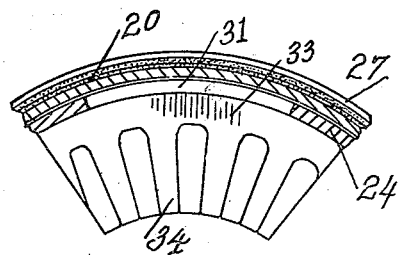
Fig. 8 is a fragmentary horizontal section taken on the line 8—8 of Fig. 3.

The dial is formed from a thin metal disk 35 (Fig. 5) having a radially extended member 36. A depression 39, a hole 40 and notches 45 will be formed simultaneously with the stamping of the disk.

On the outer face of the main dial plate graduations designated by Roman numerals "X" "XI," etc., are inscribed and arranged as the dial of a clock, to convey to the casual observer the impression that the appliance is in fact a clock and thereby reduce to some extent the temptation of curious or malevolent persons to tamper with the bank. The main dial plate has also a circular series of graduations 43 surrounding a counter sunk dial 42 having a pointer 47 simulating the second hand of the clock.

Figure 3:
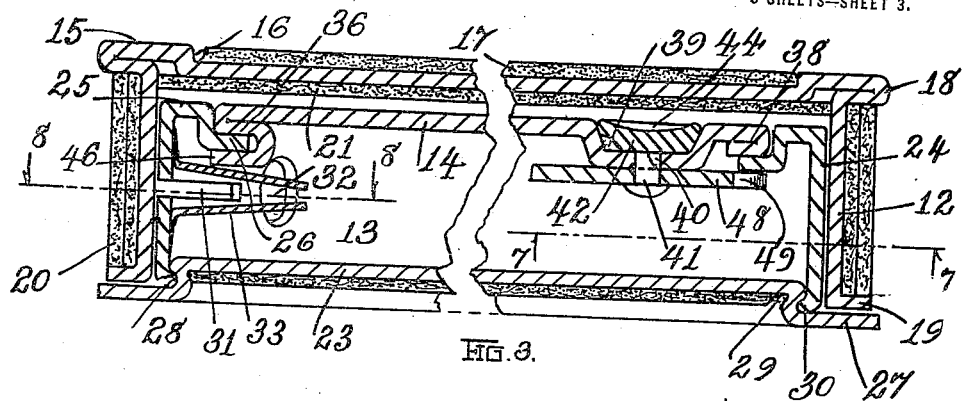
Fig. 3 is a greatly enlarged vertical section through the same bank taken on the line 3—3 of Fig. 2.

The dotted circle 37 indicates the line of folding the blank to form the double rim 38 (Fig. 3).

The rim 38 extends entirely around the dial plate and has a flat lower surface which slides evenly on the flat upper surface of the internal flange 26 in the box 13 to prevent any rocking movement of the dial plate which, if occurring, might enable a person with sensitive touch to pick up the combination of the locking device.

In forming the dial-plate the member 36 will be bent inwardly along the line 36ª to lie flat against the inner face of the disk and will be bent transversely on itself along the lines 36ᵇ and 36ᶜ to form the hook member 46 engaging on the under side of the internal flange 26 of the cash box. The depression 39 accommodates the counter sunk small or second dial 42. The small dial has a concavity 44 to receive the end of the thumb of the operator to facilitate the rotation of the small dial.

The small dial has an integral pivot 41 which is rotative in the hole 40 in the main dial plate. A disk 48 permanently attached to the pivot 41 rotates with the small dial and has a radial notch 49.

Figure 7:
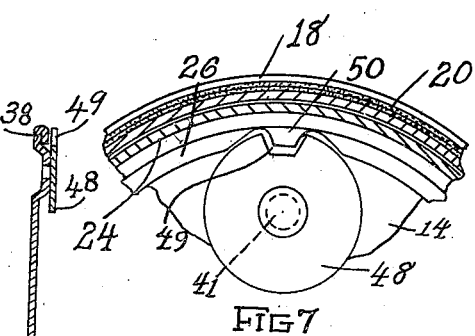
Fig. 7 is a fragmentary horizontal section taken on the line 7—7 of Fig. 3.
Figure 9:
Fig. 9 is a vertical section on the line 9—9 of Fig. 6.

The internal flange 26 in the cash box is notched as shown in Fig. 7 to form a tooth 50. The upper surface of the disk 48; the lower surface of that part of the main dial plate which is under the depression 39; and the under surface of the internal flange 26 are all in the same horizontal plane, in order that when the main dial plate is rotated the disk 48 will slide evenly on the under surface of the internal flange 26, and the disk engaging on the flange will normally prevent lifting of the dial plate.

The tooth 50 may be located in different positions on the internal flange 26; for instance; in one lock the tooth 50 may be immediately under the letter "X" on the dial when the characters "XII" are at the top of the dial; in another clock the tooth may be immediately under the character "III" when the characters "XII" are at the top of the dial; and so on for each of the characters "I" to "XI" inclusive. Likewise the notch 49 of the disk 48 may be located in different positions relatively to the graduations 43 surrounding the smaller dial 42; for instance, in one clock the notch may be in such position on the disk that the notch will be immediately under the tooth 50 when the pointer 47 points to the graduation "15;" in another lock the notch may be located so that it will be immediately under the tooth 50 when the pointer points to the graduation "30"; and so on according to the different graduations surrounding the small dial.

The main dial 14 being rotative on the internal flange 26 and the small dial being rotative in the main dial, it is obvious that both dials must be rotated to bring the notch 49 and the tooth 50 into such relation to each other that the disk 48 may be moved upwardly without striking the flange 26, thereby permitting the detaching of the dial plate 14. It is obvious also that by reason of the variable possible locations of the tooth 50 and the variable possible locations of the notch 49, the locking device is capable of a large number of permutations, thus rendering it practically non-pickable.

The combinations of the respective locks of a series of home-savings banks issued by a given commercial bank will be known only to a trusted officer or agent of the issuing bank.

The casing having a depression 16 to contain the tablet 17; a flat face 15, surrounding and protecting the tablet; and outwardly extended circumferential rims 18 and 19 protecting the paper rings 20 surrounding the casing; and the tabular record 21 inside the casing are features of value inasmuch as they contribute to the tidy appearance of the bank and admit of an accurate account of the savings placed therein and also admit of effective advertising of the commercial bank issuing the home savings bank.

Mode of use.

The commercial institution distributing the home-savings banks will keep a record of the combination of each bank of a series and of the names of the users of the respective banks. In order to place money in the home-savings bank the user will remove the casing 12 and will insert the money through the slot 31, or through the opening 32, as the case may be, and will at the same time enter the amount on the record 21 and so for each time money is placed in the bank. At convenient periods the user will take the bank to the institution issuing it and the authorized agent of the institution will unlock the bank and count the money, and if the record 21 has been accurately kept his count will agree with the record and the user will receive credit for the full amount shown by the record, and a new record sheet will be placed in the casing for use during the next ensuing period.

When the user wishes to discontinue the use of the bank he will return it to the institution from which he received it and the institution will renovate it by removing the worn or dingy tablet 17 and replacing it with a fresh one; and will remove the outside paper ring 20 to expose the underlying fresh ring; and the bank will then be in condition for use by another customer.

I do not restrict my claims to the precise construction shown and described but wish to avail of such minor variations as fairly come within the scope of the claims.

Having fully described my invention what I claim as new and desire to secure by Letters Patent is:

1. In a home-savings bank, the combination of a cash box; a casing enclosing the cash box and having a recessed top and outwardly projected circumferential rims, a tablet in the recess in the top of the casing and a number of removable rings surrounding the casing between its circumferential rims.

2. A casing comprising a recessed top, laterally extended circumferential rims, a tablet in the recess of the top, removable rings between said rims and a record sheet fixed inside the casing; in combination with a cash box contained in the casing and having a recessed bottom plate and a disk in the recess of said bottom plate.

3. In an appliance of the class described, the combination of a cylindrical box having an internal flat flange provided with a tooth, a circular main dial plate rotative on the internal flange of the box; a counter-sunk dial rotative in the main dial plate and provided with a pointer; a circular series of graduations adjacent to the circumference of the main dial plate; a circular series of graduations on the main dial plate surrounding the counter-sunk dial; and a disk rotating with the counter-sunk dial and having a notch registrable with the tooth on the internal flange of the box, upon proper rotation of the main dial plate and the counter-sunk dial relatively to each other.

4. In a home savings bank, the combination of a cash box having an internal flange provided with a tooth; a graduated main dial plate rotative in the cash box; a counter-sunk dial rotative in the main dial plate; and a disk rotative by the counter-sunk dial and having a notch co-acting with the tooth on said internal flange of the cash box.

5. In a bank of the class described, in combination with a box having an internal toothed flange, a rotative dial plate having a circumferential rim adapted to slide on the upper face of said toothed flange; and a hook member and a rotative disk adapted to slide on the lower face of the same toothed flange.

In witness whereof I have hereunto signed my name at Springfield, Sangamon County, Illinois, this 4th day of November, 1921.

VAN EVERY EDWARDS.

Witnesses:
 WAYNE HUDSON,
 N. DU BOIS.